(12) United States Patent
Pozzo et al.

(10) Patent No.: US 10,537,854 B2
(45) Date of Patent: *Jan. 21, 2020

(54) CERAMIC PROTON-CONDUCTING MEMBRANES

(71) Applicant: University of Washington, Seattle, WA (US)

(72) Inventors: Lilo D. Pozzo, Seattle, WA (US); Anthony William Moretti, Seattle, WA (US); Gregory M. Newbloom, Seattle, WA (US); Aaron West, Seattle, WA (US); Eden Rivers, Seattle, WA (US)

(73) Assignee: University of Washington, Seattle, WA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/796,607

(22) Filed: Oct. 27, 2017

(65) Prior Publication Data

US 2018/0117535 A1 May 3, 2018

Related U.S. Application Data

(63) Continuation of application No. PCT/US2017/016246, filed on Feb. 2, 2017.
(Continued)

(51) Int. Cl.
*B01D 67/00* (2006.01)
*B01D 39/20* (2006.01)
(Continued)

(52) U.S. Cl.
CPC ..... *B01D 67/0048* (2013.01); *B01D 39/2068* (2013.01); *B01D 67/0076* (2013.01);
(Continued)

(58) Field of Classification Search
None
See application file for complete search history.

(56) References Cited

U.S. PATENT DOCUMENTS 2,483,868 A 10/1949 Archer et al.
2,980,558 A 4/1961 Dempey et al.
(Continued)

FOREIGN PATENT DOCUMENTS

CN 1424138 A 6/2003

OTHER PUBLICATIONS

International Search Report and Written Opinion dated Sep. 26, 2017, issued in corresponding International Application No. PCT/US2017/016246, filed Feb. 2, 2017, 15 pages.
(Continued)

*Primary Examiner* — Lucas J. O'Donnell
(74) *Attorney, Agent, or Firm* — Christensen O'Connor Johnson Kindness PLLC

(57) ABSTRACT

Disclosed herein are ceramic selective membranes and methods of forming the ceramic selective membranes by forming a selective silica ceramic on a porous membrane substrate. Representative ceramic selective membranes include ion-conductive membranes (e.g., proton-conducting membranes) and gas selective membranes. Representative uses for the membranes include incorporation into fuel cells and redox flow batteries (RFB) as ion-conducting membranes.

20 Claims, 11 Drawing Sheets

Related U.S. Application Data

(60) Provisional application No. 62/290,053, filed on Feb. 2, 2016.

(51) Int. Cl.

| | |
|---|---|
| *B01D 71/02* | (2006.01) |
| *H01M 8/1053* | (2016.01) |
| *H01M 8/1062* | (2016.01) |
| *H01M 8/1016* | (2016.01) |
| *H01M 8/18* | (2006.01) |
| *B01D 69/10* | (2006.01) |
| *B01D 69/12* | (2006.01) |
| *H01M 8/0236* | (2016.01) |
| *H01M 8/0239* | (2016.01) |
| *H01M 8/0245* | (2016.01) |
| *B01D 71/26* | (2006.01) |
| *B01D 71/28* | (2006.01) |
| *B01D 71/76* | (2006.01) |
| *B01D 61/02* | (2006.01) |
| *B01D 53/22* | (2006.01) |

(52) U.S. Cl.
CPC ..... *B01D 67/0079* (2013.01); *B01D 67/0088* (2013.01); *B01D 69/105* (2013.01); *B01D 69/12* (2013.01); *B01D 71/02* (2013.01); *B01D 71/027* (2013.01); *B01D 71/26* (2013.01); *B01D 71/28* (2013.01); *B01D 71/76* (2013.01); *H01M 8/0236* (2013.01); *H01M 8/0239* (2013.01); *H01M 8/0245* (2013.01); *H01M 8/1016* (2013.01); *H01M 8/1053* (2013.01); *H01M 8/1062* (2013.01); *H01M 8/188* (2013.01); *B01D 53/228* (2013.01); *B01D 61/025* (2013.01); *B01D 2256/16* (2013.01); *B01D 2257/102* (2013.01); *B01D 2257/504* (2013.01); *B01D 2323/286* (2013.01); *H01M 2300/0094* (2013.01); *Y02E 60/528* (2013.01)

(56) References Cited

U.S. PATENT DOCUMENTS

| | | | |
|---|---|---|---|
| 3,703,417 | A | 11/1972 | Rosa et al. |
| 3,843,341 | A | 10/1974 | Hammel et al. |
| 4,645,519 | A | 2/1987 | Fraioli et al. |
| 5,164,003 | A | 11/1992 | Bosco et al. |
| 5,435,958 | A | 7/1995 | Dinnage et al. |
| 6,447,943 | B1 | 9/2002 | Peled et al. |
| 7,045,106 | B2 | 5/2006 | Takahashi et al. |
| 10,124,296 | B2 * | 11/2018 | Pozzo .............. B01D 67/0048 |
| 2003/0012942 | A1 | 1/2003 | Larsen et al. |
| 2003/0211378 | A1 | 11/2003 | Wald et al. |
| 2004/0040416 | A1 | 3/2004 | Erlebacher et al. |
| 2004/0241522 | A1 | 12/2004 | Ono et al. |
| 2005/0035500 | A1 | 2/2005 | Matsumoto et al. |
| 2005/0079374 | A1 | 4/2005 | Asai |
| 2006/0040175 | A1 | 2/2006 | Zuckerbrod et al. |
| 2008/0311390 | A1 | 12/2008 | Seal et al. |
| 2009/0090241 | A1 * | 4/2009 | Julbe .................. B01D 53/228 95/53 |
| 2009/0209668 | A1 | 8/2009 | Lee et al. |
| 2011/0081416 | A1 | 4/2011 | Jammaer et al. |
| 2014/0012034 | A1 | 1/2014 | Shaffer et al. |
| 2014/0080039 | A1 | 3/2014 | Easton et al. |
| 2015/0349369 | A1 | 12/2015 | Li et al. |

OTHER PUBLICATIONS

Carroll, N.J., et al., "Microfluidic Synthesis of Monodisperse Nanoporous Oxide Particles and Control of Hierarchical Pore Structure," ACS Applied Materials & Interfaces 5(9)3524-3529, May 2013.

Choi, S., et al., "Fabrication and Gas Separation Properties of Polybenzimidazole (PBI)/Nanoporous Silicates Hybrid Membranes," Journal of Membrane Science 316(1-2):145-152, May 2008.

Dunn, B., et al., "Electrical Energy Storage for the Grid: A Battery of Choices," Science 334(6058):928-935, Nov. 2011.

Fricke, J., and T. Tillotson, "Aerogels: Production, Characterization, and Applications," Thin Solid Films 297(1-2):212-223, Apr. 1997.

Gao, G.-M., et al., "Preparation of Silica Aerogel From Oil Shale Ash by Fluidized Bed Drying," Powder Technology 197(3):283-287, Jan. 2010.

Gold, S., et al., "Acid Loaded Porous Silicon as a Proton Exchange Membrane for Micro-Fuel Cells," Journal of Power Sources 135(1-2):198-203, Sep. 2004.

He, J., et al., "Preparation of Porous and Nonporous Silica Nanofilms from Aqueous Sodium Silicate," Chemistry of Materials 15(17):3308-3313, Aug. 2003.

Jiang, F., et al., "Fast Proton-Conducting Glass Membrane Based on Porous Phosphosilicate and Perfluorosulfonic Acid Polymer," Journal of Power Sources 196(3):1048-1054, Feb. 2011.

Jin, Y.G., et al., "Phosphonic Acid Functionalized Silicas for Intermediate Temperature Proton Conduction," Journal of Materials Chemistry 19(16):2363-2372, Apr. 2009.

Kazemimoghadam, M., "New Nanopore Zeolite Membranes for Water Treatment," Desalination 251(1-3):176-180, Feb. 2010.

Klichko, Y., "Mesostructured Silica for Optical Functionality, Nanomachines, and Drug Delivery," Journal of the American Ceramic Society 92(s1):s2-s10, Jan. 2009.

Lee, J.-S., et al., "Synthesis of Mesoporous Silicas of Controlled Pore Wall Thickness and Their Replication to Ordered Nanoporous Carbons With Various Pore Diameters," Journal of the American Chemical Society 124(7):1156-1157, Feb. 2002.

Lin, H.-P., and C.-P. Tsai, "Synthesis of Mesoporous Silica Nanoparticles From a Low-Concentration CnTMAX-Sodium Silicate Components," Chemistry Letters 32(12):1092-1093, Dec. 2003.

Liu, X., and J. He, "One-Step Hydrothermal Creation of Hierarchical Microstructures Toward Superhydrophilic and Superhydrophobic Surfaces," Langmuir 25(19):11822-11826, Oct. 2009.

Moghaddam, S., et al., "An Inorganic-Organic Proton Exchange Membrane for Fuel Cells With a Controlled Nanoscale Pore Structure," Nature Nanotechnology 5(3):230-236, Mar. 2010.

Newalkar, B.L., and S. Komarneni, "Synthesis and Characterization of Microporous Silica Prepared With Sodium Silicate and Organosilane Compounds," Journal of Sol-Gel Science and Technology 18(3):191-198, Aug. 2000.

Parasuraman, A., et al., "Review of Material Research and Development for Vanadium Redox Flow Battery Applications," Electrochimica Acta 101:27-40, Jul. 2013.

Pramer, D., "The Influence of Physical and Chemical Factors on the Preparation of Silica Gel Media," Applied Microbiology 5(6):392-395, Nov. 1957.

Prifti, H., et al., "Membranes for Redox Flow Battery Applications," Membranes 2(2)175-306, Jun. 2012.

Ray, R.C., and P.B. Ganguly, "The Optimum Conditions for the Formation of Silica Gel From Alkali Silicate Solutions," Journal of Physical Chemistry 34(2):352-358, 1930.

Selvam, P., et al., "Recent Advances in Processing and Characterization of Periodic Mesoporous MCM-41 Silicate Molecular Sieves," Industrial & Engineering Chemistry Research 40(15):3237-3261, Jul. 2001.

Shen, C.-H., et al., "Sodium Silicate/Graphite Conductive Composite Bipolar Plates for Proton Exchange Membrane Fuel Cells," Journal of Power Sources 162(1):460-463, Nov. 2006.

Sinkó, K., "Influence of Chemical Conditions on the Nanoporous Structure of Silicate Aerogels," Materials 3(1):704-740, Jan. 2010.

Teixeira, J., "Small-Angle Scattering by Fractal Systems," Journal of Applied Crystallography 21(6):781-785, 1988.

Tognonvi, M.T., et al., "Physical-Chemistry of Sodium Silicate Gelation in an Alkaline Medium," Journal of Sol-Gel Science and Technology 58(3):625-635, Jun. 2011.

(56) References Cited

OTHER PUBLICATIONS

Toh, G.M., et al., "Sodium Silicate Based Sol-Gel Structures for Generating Pressure-Driven Flow in Microfluidic Channels," Journal of Chromatograpy A 1217(30):5004-5011, Jul. 2010.
Tompsett, G.A., et al., "Microwave Synthesis of Nanoporous Materials," ChemPhysChem 7(2):296-319, Feb. 2006.
"Vanadium Redox (VRB) Flow Batteries," Energy Storage Association, <http://energystorage.org/energy-storage/technologies/vanadium-redox-vrb-flow-batteries> [retrieved Feb. 9, 2016], 3 pages.
Viswanathan, V., et al., "Estimation of Capital and Levelized Cost for Redox Flow Batteries," U.S. Department of Energy (USDOE-OE ESS), Peer Review at Washington, DC, Sep. 28, 2012,16 pages.
Wang, R., et al., "Highly Ordered Supermicroporous Silica," Journal of Physical Chemistry 111(29):10955-10958, 2007.
Yachi, A., et al., "Silica Gel With Continuous Macropores Prepared From Water Glass in the Presence of Poly(Acrylic Acid)," Journal of Non-Crystalline Solids 351(4):331-339, Feb. 2005.
Zhang, L., et al., "Drying and Nondrying Layer-by-Layer Assembly for the Fabrication of Sodium Silicate/TiO$_2$, Nanoparticle Composite Films," Langmuir 28(3):1816-1823, Jan. 2012.
International Preliminary Report on Patentability dated Aug. 16, 2018, issued in corresponding International Application No. PCT/US2017/016246, filed Feb. 2, 2017, 13 pages.

\* cited by examiner

“CERAMIC PROTON-CONDUCTING MEMBRANES”

CROSS-REFERENCES TO RELATED APPLICATIONS

This application is a continuation of International Application No. PCT/US2017/016246, filed Feb. 2, 2017, which claims the benefit of U.S. Provisional Application No. 62/290,053, filed Feb. 2, 2016, the disclosures of which are expressly incorporated herein by reference in their entirety.

STATEMENT OF GOVERNMENT LICENSE RIGHTS

This invention was made with Government support under Contract No. W911NF-13-1-0166 awarded by the Department of Defense via the Army Research Office. The Government has certain rights in the invention.

BACKGROUND

Fuel cells and redox flow batteries (RFB) are powerful energy storage technologies that rely on selective transport of ions across a membrane in order to generate electrical current. Presently, the standard materials used for membranes in these technologies are perfluorinated sulfonic acid (PFSA) materials, such those as marketed under the name NAFION. These PFSA materials are desirable for their resistance to harsh environments and ion-conducting properties. However, these materials are relatively expensive and further improvements in operating properties are desirable.

Silicate proton-conducting materials are known but are not sufficiently developed so as to be commercially viable.

One common mechanism for proton transport is Grottuss hopping, wherein hydronium ions "hop" from water molecule to water molecule. This mechanism requires that water be sufficiently free to rotate and diffuse in order to promote solvation of a hydronium ion. Therefore, the design of a silicate proton-conducting material should have pores of sufficient size to promote the molecular motion of water (i.e., facilitate hydronium solvation and proton hopping). This size should be larger than a single water molecule (i.e., radius of 0.138 nm) but not so large as to facilitate diffusive transport of other molecules.

Accordingly, the development of robust, inexpensive proton-conducting materials is desired, yet significant compositional and structural limitations presently prevent the use of silicate materials as replacements for PFSA materials.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method of forming a ceramic selective membrane is provided. In one embodiment, the method includes:

applying a ceramic precursor sol to a porous membrane substrate; and gelling the ceramic precursor sol, using a sol-gel process, to form a selective silica ceramic from the ceramic precursor sol, thereby providing a ceramic selective membrane comprising the selective silica ceramic supported by the porous membrane substrate.

In another aspect, a ceramic selective membrane is provided, comprising a selective silica ceramic supported by a porous membrane substrate.

In another aspect, a selective membrane is provided that includes a ceramic selective membrane comprising a selective silica ceramic supported by a porous membrane substrate as previously described.

In another aspect, a ceramic selective membrane is provided, as formed by a method according to any of the disclosed method embodiments.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7A is a top view and FIG. 7B is a dense cross-sectional view.

DETAILED DESCRIPTION

Disclosed herein are ceramic selective membranes and methods of forming the ceramic selective membranes by forming a selective silica ceramic on a porous membrane substrate. Representative ceramic selective membranes include ion-conductive membranes (e.g., proton-conducting membranes) and gas selective membranes. Representative uses for the membranes include incorporation into fuel cells and redox flow batteries (RFB) as ion-conducting membranes.

Prior work on silica membranes focused on thin membranes, particularly those formed entirely from silica. The membranes disclosed herein are focused on durability and performance, with an eye towards commercial relevance (e.g., the replacement of NAFION membranes in RFBs and fuel cells). Accordingly, the disclosed membranes are relatively thicker because the precursor sol fills the support. Generally, it is known that silica materials crack when coated on top of porous support structures with pore sizes greater than 100 nm. The disclosed membranes are tailored to reduce and eliminate cracking in many ways, including both compositionally (e.g., using polymer additives in the sol that are incorporated into the ceramic matrix) and by "repair" or "post-processing" by applying a second (or further) layer of ceramic and/or applying a non-ceramic coating to "finish" the membrane.

The methods and many variations will now be discussed in further detail. Further below the compositions (membranes) formed by the methods will also be discussed in greater detail.

Methods of Forming Ceramic Selective Membranes

In one aspect, a method of forming a ceramic selective membrane is provided. In one embodiment, the method includes:

applying a ceramic precursor sol to a porous membrane substrate; and gelling the ceramic precursor sol, using a sol-gel process, to form a selective silica ceramic from the ceramic precursor sol, thereby providing a ceramic selective membrane comprising the selective silica ceramic supported by the porous membrane substrate.

Figure 1A:
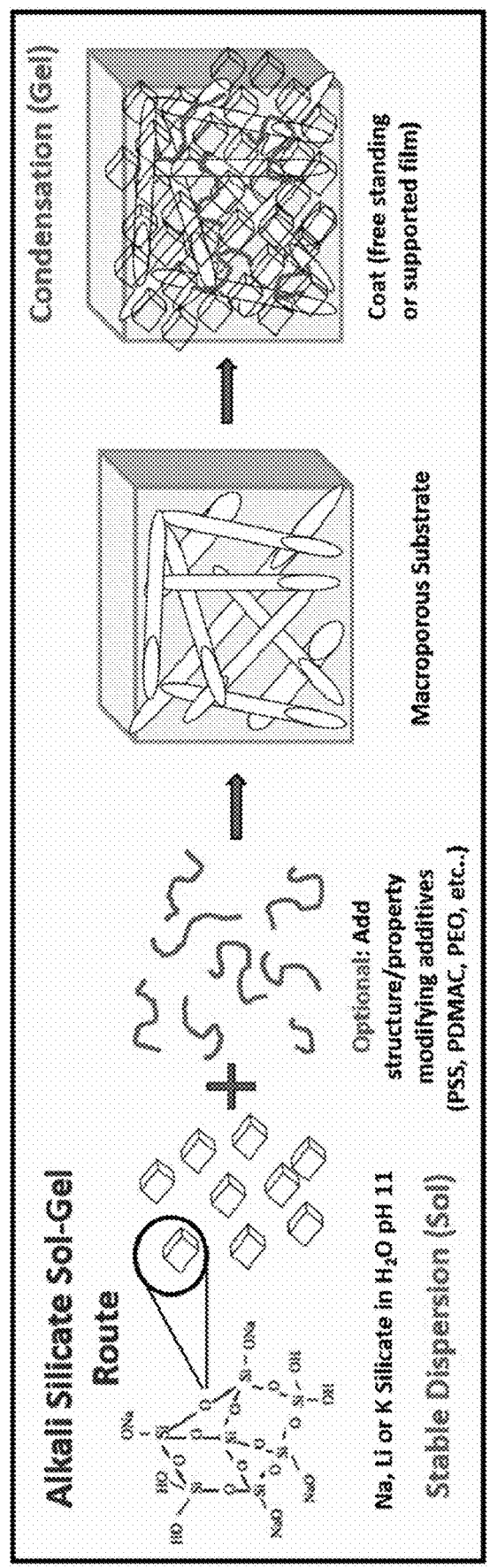
FIG. 1A is a schematic representation of sol-gel strategies using alkali silicates to produce ceramic selective membranes in accordance with certain embodiments disclosed herein.

Turning first to FIG. 1A, a schematic representation of sol-gel methods using alkali silicates to produce ceramic selective membranes in accordance with certain embodiments disclosed herein. In particular, the sol includes sodium silicate, lithium silicate, or potassium silicate as the ceramic precursor sol. In certain embodiments an "optional" additive is added to the ceramic precursor sol. A "macroporous substrate" (also referred to herein as a porous membrane substrate) is used as the substrate for the formation of a sol-gel and eventually a condensate gel of selective silica ceramic supported by the porous membrane substrate, to provide a ceramic selective membrane.

Figure 1B:
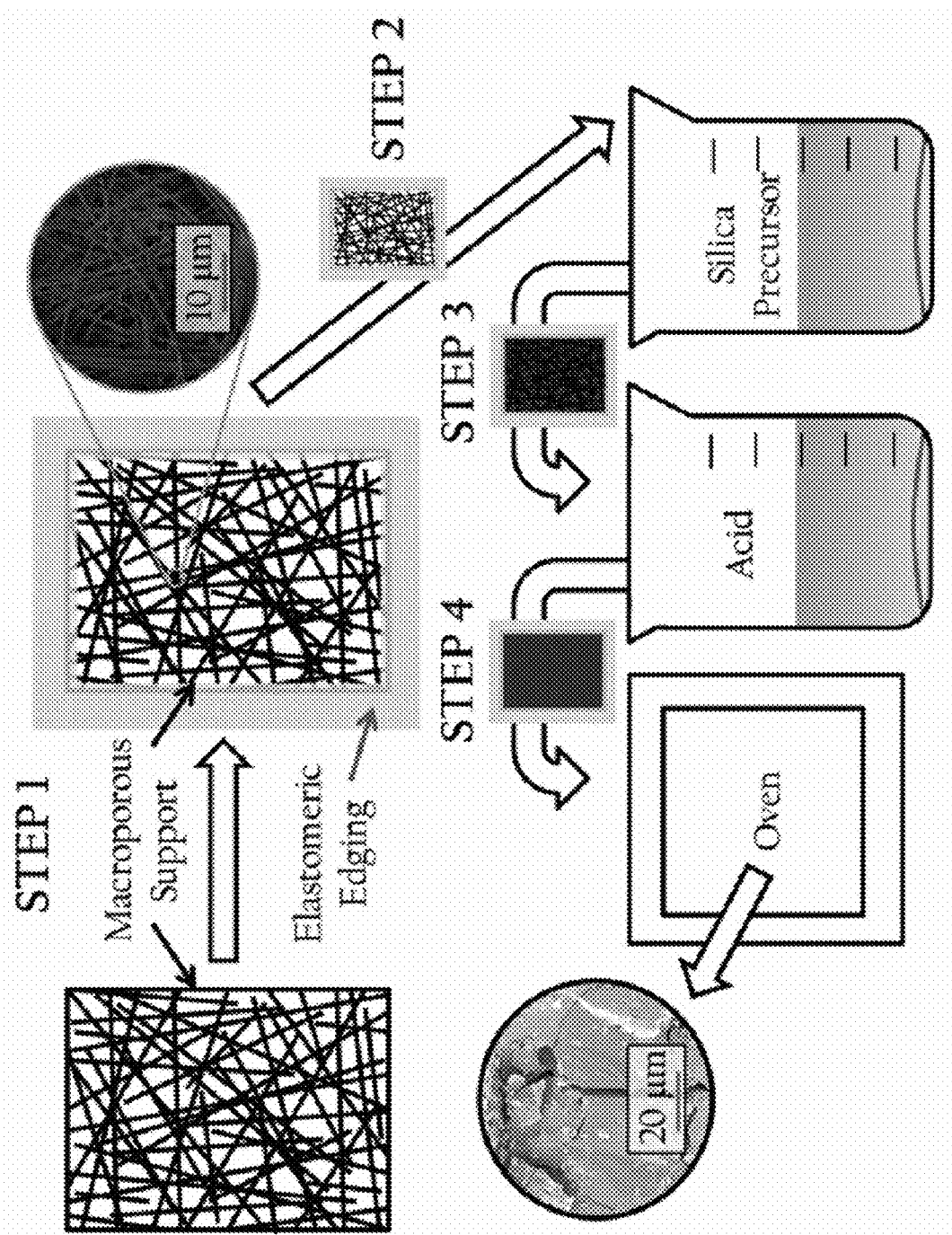
FIG. 1B illustrates an exemplary process for producing a ceramic selective membrane having compressible edging ("elastomeric edging") in accordance with certain embodiments disclosed herein. STEP 1: Elastomeric edging is affixed to a pre-sized porous membrane support. Solvent soluble polymer such as poly(styrene-isobutylene-styrene) (SIBS) is cast to the size of the support while also defining the active area. Solvent is placed on the edges of the support and then sandwiched by the edging. The solvent partially dissolves the edging which results in strong adhesion with the support. STEP 2: The support is dipped in a silica precursor solution. STEP 3: The coated support is dipped in an acid bath. STEP 4: The membrane is dried at low temperature (e.g., 60° C.). The process conditions of steps 2-4 can be varied to produce compressible ceramic selective membranes with specific performance attributes (e.g., proton conduction, flexibility, durability, pore size, etc.).

FIG. 1B illustrates an exemplary process for producing a ceramic selective membrane having compressible edging ("elastomeric edging") in accordance with certain embodiments disclosed herein. STEP 1: Elastomeric edging is affixed to a pre-sized porous membrane support. Solvent soluble polymer such as poly(styrene-isobutylene-styrene) (SIBS) is cast to the size of the support while also defining the active area. Solvent is placed on the edges of the support and then sandwiched by the edging. The solvent partially dissolves the edging which results in strong adhesion with the support. STEP 2 : The support is dipped in a silica precursor solution. STEP 3 : The coated support is dipped in an acid bath. STEP 4 : The membrane is dried at low temperature (e.g., 60° C.). The process conditions of steps 2 - 4 can be varied to produce compressible ceramic selective membranes with specific performance attributes (e.g., proton conduction, flexibility, durability, pore size, etc.).

Precursors

The precursor is the solution (sol) from which the ceramic is formed. One or more additives can be added to the sol in order to enable the final ceramic membrane with particular properties, as will be discussed in greater detail below.

In one embodiment, the ceramic precursor sol comprises an alkaline silicate solution.

In one embodiment, the alkaline silicate solution is formed from a silicate selected from the group consisting of sodium silicate, lithium silicate, and potassium silicate.

In one embodiment, the alkaline silicate solution has a concentration in the range of 5 wt % to 50 wt %. In one embodiment, the alkaline silicate solution has a concentration in the range of 12 wt % to 30 wt %.

Porous Membrane Substrates

The porous membrane substrate (sometimes referred to herein simply as the "substrate") is the structural foundation upon which the ceramic is formed. The substrate provides mechanical strength and a porous structure. When the ceramic is formed on the substrate, the substrates relatively large pores are closed and filled with the ceramic until nanometer- or angstrom-sized pores remain in the final membrane.

In one embodiment, the porous membrane substrate has a plurality of pores 10 nm or greater in diameter.

In one embodiment, the porous membrane substrate has a chemical surface functionality that is chemically similar to the ceramic precursor sol.

In one embodiment, the porous membrane substrate is selected from the group consisting of silica filter paper, polyvinylidene fluoride (PVDF), polyether ether ketone (PEEK), polytetrafluoroethylene (PTFE).

Compressible Edging

Compressible edging enables membranes in certain embodiments to be incorporated into batteries, fuel cells, or other systems where a gasket sealing the membrane is required. Accordingly, the compressible edging is both mechanically compressible and also resistant to the heat and/or harsh chemical environments in which the membranes are utilized.

In one embodiment, the method further includes a step of impregnating an edge portion of the porous membrane substrate with a compressible polymer prior to the step of applying the ceramic precursor sol to the porous membrane substrate.

In one embodiment, the step of impregnating the edge portion of the porous membrane substrate with the compressible polymer comprises impregnating all edges of the porous membrane substrate with the compressible polymer, sufficient to form a gasket bordering the porous membrane substrate.

In one embodiment, a compressible polymer edging is formed after formation of the ceramic selective membrane (i.e., after the sol-gel process). In a further embodiment, the compressible polymer edging is formed using ultrasonic welding or hot pressing.

In one embodiment, the edge portion is 1 mm or greater in width. In one embodiment, the edge portion is 5 mm or greater in width. In one embodiment, the edge portion is 1 cm or greater in width.

In one embodiment, the compressible polymer comprises a thermoplastic elastomeric polymer. In one embodiment, thermoplastic elastomeric polymer is selected from the group consisting of poly(styrene-isobutylene-styrene) (SIBS), polyvinylidene fluoride (PVDF), and polydimethylsiloxane (PDMS).

In one embodiment, impregnating the edge portion of the porous membrane substrate with the compressible polymer comprises a method selected from the group consisting of melting, solution deposition, and in situ reaction.

Chemical Gelation

After the sol is coated on the membrane, the sol must be gelled. In one embodiment, gelling the ceramic precursor sol comprises chemical gelation.

In one embodiment, chemical gelation comprises exposing the ceramic precursor sol to an acid solution. In one embodiment, the acid solution is greater than 0.001 N. In one embodiment, the acid solution is greater than 1 N. In one embodiment, the acid solution is greater than 3 N.

In one embodiment, the acid solution is selected from the group consisting of sulfuric acid, nitric acid, acetic acid, hydrochloric acid, methane sulfonic acid, and phosphoric acid.

In one embodiment, the step of chemical gelation is completed in less than 1 hour. In one embodiment, the step of chemical gelation is completed in less than 24 hours In one embodiment, the step of chemical gelation is completed in less than 96 hours.

In one embodiment, the step of chemical gelation further comprises, after exposing the ceramic precursor sol to an acid solution, exposing to a temperature in the range of 20° C. to 100° C. Keeping the temperature low in this embodiment is important, such that no sintering or calcination occurs, which damage the durability of the final ceramic selective membrane.

Heating Gelation

In one embodiment, gelling the ceramic precursor sol comprises exposing to a temperature in the range of 20° C. to 100° C. Keeping the temperature low in this embodiment is important, such that no sintering or calcination occurs, which damage the durability of the final ceramic selective membrane. In a further embodiment, the step of gelling does not include exposure to acid.

In one embodiment, the ceramic selective membrane comprises pores in the size range of 0.1 nm to 10 nm in diameter. The pore size is the final pore size of the ceramic selective membrane, including all layers of ceramic and any post-processing layers (e.g., a "finishing" alkyl layer). In one embodiment, the ceramic selective membrane comprises pores in the size range of 0.1 nm to 5 nm in diameter. In one embodiment, the ceramic selective membrane comprises pores in the size range of 0.1 nm to 1 nm in diameter. In one embodiment, the ceramic selective membrane comprises pores in the size range of 0.5 nm to 1 nm in diameter.

In one embodiment, the ceramic selective membrane has a thickness in the range of 0.1 mm to 1 mm. In one embodiment, the ceramic selective membrane has a thickness in the range of 0.1 mm to 0.5 mm. In one embodiment, the ceramic selective membrane has a thickness in the range of 0.2 mm to 0.4 mm.

In certain embodiments, multiple layers of ceramic are deposited to provide a thicker ceramic layer on the support and/or improve durability of the final membrane. In one embodiment two coatings of ceramic are performed. In a further embodiment, three coatings of ceramic are performed. Multiple coatings result in a denser and more defect-free membrane structure. As an example, at 27 wt % sodium silicate solution, a single coating of ceramic may suffice to produce a sufficiently dense and defect-free coating. More than one coating is required for 15 wt % and 5 wt % sodium silicate concentration when using a 250 μm substrate.

In one embodiment, the method further includes a step of depositing at least one additional layer of ceramic by:
applying the ceramic precursor sol to the selective silica ceramic supported by the porous membrane substrate; and
gelling the ceramic precursor sol to provide a double-coated selective silica ceramic supported by the porous membrane substrate.

In a further embodiment, the step of depositing at least one additional layer of ceramic includes repeating for a second time the step of depositing at least one additional layer of ceramic, to provide a triple-coated selective silica ceramic supported by the porous membrane substrate.

Additives

As previously discussed, additives are added to the sol in order to enable specific desirable properties of the membrane when formed.

In one embodiment, the ceramic precursor sol further comprises an additive selected from the group consisting of a selectivity additive configured to increase ion transport properties of the ceramic selective membrane, a durability additive configured to improve durability of the ceramic selective membrane, and a catalyst additive configured to add catalytic properties to the ceramic selective membrane.

In one embodiment, the additive is a selectivity additive selected from the group consisting of an ionic-conducting polymer and a gas conducting polymer. To improve selectivity, in certain embodiments a polymer is an additive used to facilitate selective ion transport. For example, proton conducting polymers such as polystyrene sulfonate (PSS), polydiallyldimethylammonium chloride (PolyDADMAC), sulfonated nanocrystalline cellulose, sulfonated poly ether ether ketone (SPEEK), sulfonated polybenzimidazole (S-PBI) or perfluorosulfonic acid (PFSA). In other embodiments, the additive is a polymers (i.e., polyvinyl alcohol, polyacrylic acid, polyacrylamide, polyethylene glycol and others) promoting selective transport of other molecules (e.g., gases or other ions). Any additive polymers are soluble or dispersible in the alkaline ceramic solution. Furthermore, they must be able to handle the harsh environments or be protected from degradation by the oxide.

In one embodiment, the additive is a durability additive selected from the group consisting of a low Young's modulus polymer configured to provide increased flexibility to the ceramic selective membrane and a high Young's modulus polymer configured to provide increased durability to the ceramic selective membrane.

In certain embodiments, the durability additive is a polymer. A low Young's modulus polymer additive will lead to flexibility of the final membrane or a high Young's modulus will lead to improved durability of the final membrane. These are soluble or dispersible in the alkaline ceramic solution able to handle the harsh environments defined earlier or be protected from degradation by the oxide. Representative durability polymer additives include polyvinyl alcohol, polyacrylic acid, polyacrylamide, and polyethylene glycol, as well as combinations and copolymers thereof.

In one embodiment, the additive is a catalyst additive selected from the group consisting of catalytic particles added to the ceramic precursor sol and catalytic particles formed with in the ceramic precursor sol. The catalyst additive is selected from the following schemes: (1) the addition of catalytic nano- or micro-particles to the sol; (2) forming catalytic particles within the sol (e.g., prior to gelation/self-assembly); (3) forming catalytic particles during the sol-gel; and (4) applying/coating the surface of the active area with catalytic particles after it is cured. Platinum is an example a catalyst additive. The catalyst additive must be able to handle the harsh environments that the membrane is exposed to (if contained externally) or be protected from degradation by the ceramic membrane (if contained internally). In one embodiment, the catalyst additive is 10 vol % or less of the membrane.

Post-Treatment of the Membrane

Post-treatment of the membrane is another route to providing specific properties to the membrane. Post treatment can be used along with additives, or instead of additives, to generate a membrane with specific properties.

In one embodiment, the method further includes depositing a finishing layer on the selective silica ceramic supported by the porous membrane substrate to provide a finished-coated selective silica ceramic supported by the porous membrane substrate.

In one embodiment, the step of depositing a finishing layer comprises treating the selective silica ceramic supported by the porous membrane substrate with a silica-based compound with a hydrolyzable group (e.g., tetraethyl orthosilicate).

In one embodiment, the step of treating the selective silica ceramic supported by the porous membrane substrate by applying a silica-based compound with a hydrolyzable group further comprises a step of exposing the silica-based compound with a hydrolyzable group to water after applying the silica-based compound with a hydrolyzable group to the selective silica ceramic supported by the porous membrane substrate.

In one embodiment, the method further includes treating the ceramic selective membrane with an agent selected from the group consisting of an ion-conductivity enhancer, a molecular-selectivity enhancer, a catalyst, and a durability enhancer.

In one exemplary embodiment, a sulfonated poly(styrene-isobutylene-styrene) (S-SIBS) coating has been shows to improve molecular selectivity of membranes in a flow battery environment. S-SIBS is referred to in FIGS. 1B, 6A, and 6B. S-SIBS can be applied using any coating method, (e.g., drop coating). In an exemplary method, the outside of a dry (fully formed) membrane was coated with <100 µm of S-SIBS polymer to reduce defects.

It is also possible to functionalize the membranes using standard silane coupling agents. This includes a silane with a sulfonic acid group to improve proton conductivity or molecular selectivity. Exemplary compounds include 3-trihydroxysilyl-1-propanesulfonic-acid and triethoxy(hexyl)silane.

Other embodiments include a silane with a long alkane group to improve durability or reduce pore size. Exemplary silanes with an alkane group are tetraethyl orthosilicate (TEOS) and triethoxy(hexyl)silane.

In an exemplary method, the outside of a membrane dipped in the sol was coated with TEOS and allowed to dry at room temperature.

In another exemplary method, a dry membrane was coated with a polystyrene sulfonate (PSS) solution and allowed to dry.

In one embodiment, the method further includes a step of exposing the ceramic selective membrane to a lower-surface-tension liquid, after gelling the ceramic precursor sol. This step helps to reduce the amount of surface cracking in the final membrane due to lower capillary stresses.

In such embodiments, instead of placing the membrane in an oven (or at room temperature) after exposing to acid after the sol is applied, the membrane is exposed to a lower surface tension fluid. In one method there is only a single exposure step into water, methanol or a 50/50 water/methanol mixture. In another variation on the method, sequential dips into water, 50/50 water/ethanol mixture and then methanol are used.

Pretreatment of the Porous Membrane Substrate

In one embodiment, the method further includes a step of applying a pretreatment to the porous membrane substrate prior to the step of applying the ceramic precursor sol to the porous membrane substrate.

In one embodiment, the pretreatment is selected from the group consisting of an acid and a polymer. In an exemplary embodiment, the substrate is not coated first with the silica sol but is instead coated with acid or polymer (polystyrene sulfonic acid). In one method, this pre-coating is at low temperature (T<100° C.) and the newly coated substrate is then taken through the standard sol/sol-gel process as disclosed herein. In an alternative method, the pre-coating is not dried and is instead dipped directly into the silica sol.

Ceramic Selective Membrane Compositions

In addition to the methods of forming ceramic selective membranes, the membranes themselves, as compositions, will now be discussed. Essentially, any membrane formed by the disclosed methods is considered an embodiment of the disclosed aspects. Accordingly, the compositions and features of the membranes flow from the previous discussion of the methods.

In another aspect, a ceramic selective membrane is provided, comprising a selective silica ceramic supported by a porous membrane substrate.

In one embodiment, the porous membrane substrate is selected from the group consisting of silica filter paper, polyvinylidene fluoride (PVDF), polyether ether ketone (PEEK), polytetrafluoroethylene (PTFE).

In one embodiment, the porous membrane substrate has a plurality of pores 10 nm or greater in diameter.

In one embodiment, the ceramic selective membrane further includes a compressible polymer edging along at least a portion of an edge of the porous membrane.

In one embodiment, the ceramic selective membrane further includes compressible polymer edging along all edges of the ceramic selective membrane, defining a gasket.

In one embodiment, the edge portion is 1 mm or greater in width. In one embodiment, the edge portion is 5 mm or greater in width. In one embodiment, the edge portion is 1 cm or greater in width.

In one embodiment, the compressible polymer comprises a thermoplastic elastomeric polymer. In one embodiment, thermoplastic elastomeric polymer is selected from the group consisting of poly(styrene-isobutylene-styrene) (SIBS), polyvinylidene fluoride (PVDF), and polydimethylsiloxane (PDMS).

In one embodiment, the selective silica ceramic comprises a plurality of layers of selective silica ceramic material.

In one embodiment, the ceramic selective membrane further includes a finishing layer coating the selective silica ceramic.

In one embodiment, the finishing layer comprises an alkyl-containing compound.

In one embodiment, the selective silica ceramic comprises an additive selected from the group consisting of a selectivity additive configured to increase ion transport properties of the ceramic selective membrane, a durability additive configured to improve durability of the ceramic selective membrane, and a catalyst additive configured to add catalytic properties to the ceramic selective membrane.

In one embodiment, the selective silica ceramic comprises a selectivity additive selected from the group consisting of an ionic-conducting polymer and a gas conducting polymer.

In one embodiment, the additive is a durability additive selected from the group consisting of a low Young's modulus polymer configured to provide increased flexibility to the ceramic selective membrane and a high Young's modulus polymer configured to provide increased durability to the ceramic selective membrane.

In one embodiment, the additive is a catalyst additive selected from the group consisting of catalytic particles and catalytic compounds incorporated into the selective silica ceramic.

In one embodiment, the ceramic selective membrane further includes a surface treatment layer on the selective silica ceramic comprising an agent selected from the group consisting of an ion-conductivity enhancer, a molecular-selectivity enhancer, a catalyst, and a durability enhancer.

Ceramic Selective Membrane Characteristics

The characteristics of the ceramic selective membranes are unique and enable use of the membranes in batteries, fuel cells, and the like.

In one embodiment, the ceramic selective membrane has a mean pore size in the range of 0.5 nm to 2 nm as determined by fitting of a polydispersed fractal model to a small angle x-ray scattering profile.

Figure 8:
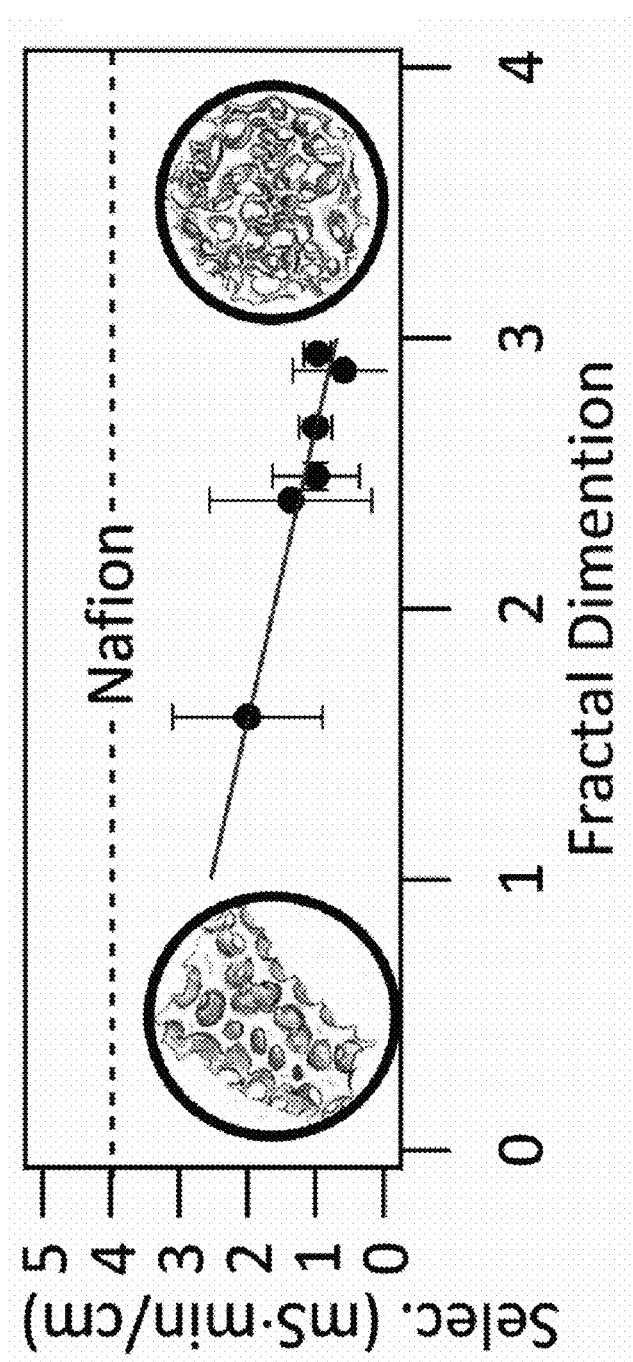
FIG. 8 graphically illustrates the fractal dimension extracted from SAXS fitting of representative membranes using the fractal model (shown in FIG. 3A). The selectivity (proton conductivity/vanadium ion permeability) is plotted as a function of the fractal dimension showing higher selectivity for lower fractal dimensions. NAFION is plotted for reference.

In one embodiment, the fractality of the pore structure is about 3 as determined by fitting of a polydispersed fractal model to a small angle x-ray scattering profile (see, e.g., FIG. 8). In one embodiment, the fractality of the pore structure is in the range of about 1.4 to about 3.

In one embodiment, the galvanodynamic proton conductivity as measured in an h-cell in 4M $H_2SO_4$ is in the range of 0.001 to 1 S/cm. In one embodiment, the galvanodynamic proton conductivity as measured in an h-cell in 4M $H_2SO_4$ is in the range of 0.05 to 1 S/cm.

In one embodiment, the permeability of a vanadium(IV) sulfate hydrate ion across the ceramic selective membrane is measured to be in the range of $1\times10\text{-}8$ to $8\times10\text{-}4$ $cm^2/min$. In one embodiment, the permeability of a vanadium(IV) sulfate hydrate ion across the ceramic selective membrane is measured to be in the range of $1\times10\text{-}6$ to $1\times10\text{-}5$ $cm^2/min$.

In one embodiment, the proton/vanadium ion selectivity of the ceramic selective membrane is defined by the ratio: proton conductivity/vanadium ion permeability and measured to be 3,500 to 58,000 $S\cdot min/cm^3$. In one embodiment, the proton/vanadium ion selectivity of the ceramic selective membrane is defined by the ratio: proton conductivity/vanadium ion permeability and measured to be 15,000 to 30,000 $S\cdot min/cm^3$.

In one embodiment, the ceramic selective membrane comprises pores in the size range of 0.1 nm to 10 nm in diameter. The pore size is the final pore size of the ceramic selective membrane, including all layers of ceramic and any post-processing layers (e.g., a "finishing" alkyl layer). In one embodiment, the ceramic selective membrane comprises pores in the size range of 0.1 nm to 5 nm in diameter. In one embodiment, the ceramic selective membrane comprises pores in the size range of 0.1 nm to 1 nm in diameter. In one embodiment, the ceramic selective membrane comprises pores in the size range of 0.5 nm to 1 nm in diameter.

In one embodiment, the ceramic selective membrane has a thickness in the range of 0.1 mm to 1 mm. In one embodiment, the ceramic selective membrane has a thickness in the range of 0.1 mm to 0.5 mm. In one embodiment, the ceramic selective membrane has a thickness in the range of 0.2 mm to 0.4 mm.

In one embodiment, the selective silica ceramic has a thickness of 0.5 µm to 750 µm disposed on the surface of the porous membrane substrate.

Selective Membranes Incorporating a Ceramic Selective Membrane

In another aspect, a selective membrane is provided that includes a ceramic selective membrane comprising a selective silica ceramic supported by a porous membrane substrate as previously described.

The disclosed membrane can be used in any existing or future-developed system where separation is desired in a manner in which the membrane can be configured (e.g., based on pore size, selectivity of transport across the membrane, etc.). In one embodiment, the selective membrane is of a type selected from the group consisting of a battery membrane (e.g., a RFB membrane), a fuel cell membrane, a food processing membrane (for example, purify glucose from starch, to clarify fruit juices, separation of gelatin from proteins, and separation of curds and whey), a reverse osmosis membrane, a gas separation membrane (for example, separation of nitrogen from air, separation of carbon dioxide from natural gas, and separation of hydrogen from light petroleum products), and a bio-separation membrane (for example, a dialysis membrane, the purification of viruses/bacteria, the separation of plasma out of blood, and the purification of pharmaceuticals to demineralize and concentrate antibiotics).

In one embodiment, the selective membrane is an ion-conducting membrane for a flow battery.

In one embodiment, the selective membrane is an ion-conducting membrane for a fuel cell.

Membranes Produced by the Methods Described

In another aspect, a ceramic selective membrane is provided, as formed by a method according to any of the disclosed method embodiments.

In another aspect, a selective membrane is provided that includes a ceramic selective membrane according to any of the disclosed embodiments.

In one embodiment, the selective membrane is of a type selected from the group consisting of a battery membrane, a fuel cell membrane, a food processing membrane, a reverse osmosis membrane, a gas separation membrane, and a bio-separation membrane.

In one embodiment, the selective membrane is an ion-conducting membrane for a flow battery.

In one embodiment, the selective membrane is an ion-conducting membrane for a fuel cell.

The following examples are included for the purpose of illustrating, not limiting, the described embodiments.

EXAMPLES

The methods of forming exemplary membranes and the characterization of the membranes are disclosed below.

An exemplary membrane is produced using the process outline in FIG. 1A. It includes dipping a macroporous support (e.g., silica filter substrate) into a 27 wt % sodium silicate solution for 30 seconds to promote wicking. That soaked support is then dipped in 3N sulfuric acid for 8 hours before being removed and dried in an oven at 70° C. for 2 hours. The process is then repeated at least once to further reduce pore size and reduce cracking, while improving durability.

Referring to FIG. 1B, an exemplary membrane production process is shown in 4 steps. STEP 1: Elastomeric edging is affixed to a pre-sized ceramic macroporous support. Solvent soluble polymer, such as poly(styrene-isobutylene-styrene) (SIBS), is cast to the size of the membrane while also defining the active area. Solvent is placed on the edges of the membrane and then sandwiched by the polymer edging. The solvent partially dissolves the edging which results in strong adhesion with the support. STEP 2: Membrane is dipped in a silica precursor solution. STEP 3: Membrane is dipped in an acid bath. STEP 4: Membrane is dried at low temperature (e.g., 60° C.). The process conditions of steps 2-4 can be varied to produce compressible ceramic proton conducting membranes with specific performance attributes.

Figure 2A:
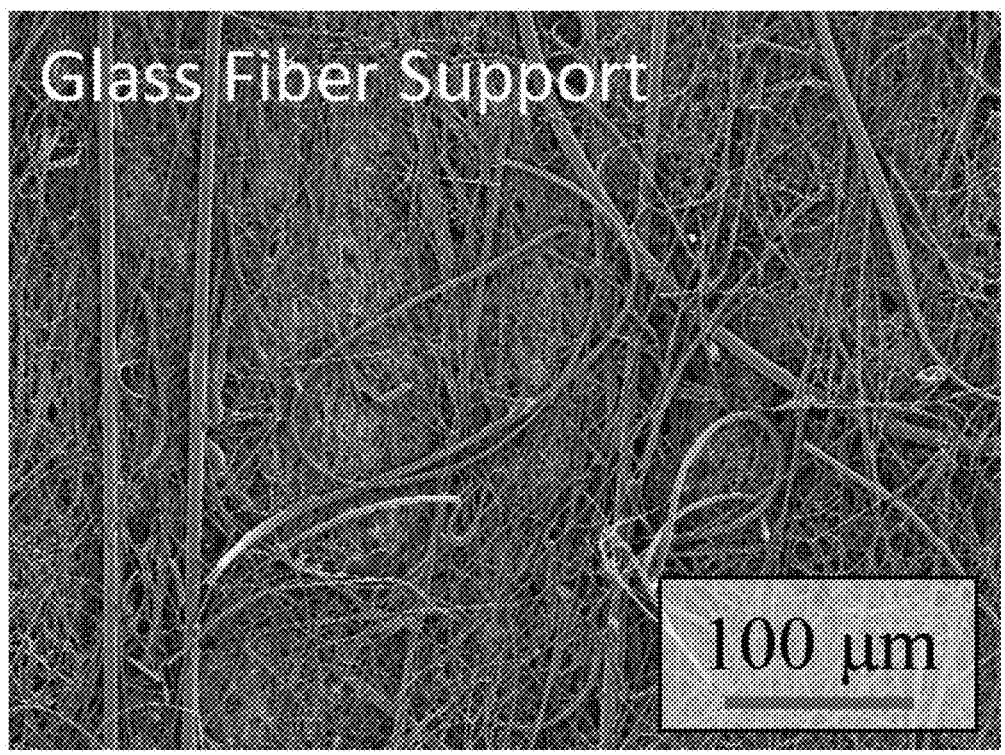
FIG. 2A is a SEM micrograph of a silica support of the type usable as a porous membrane substrate in accordance with certain embodiments disclosed herein.
Figure 2B:
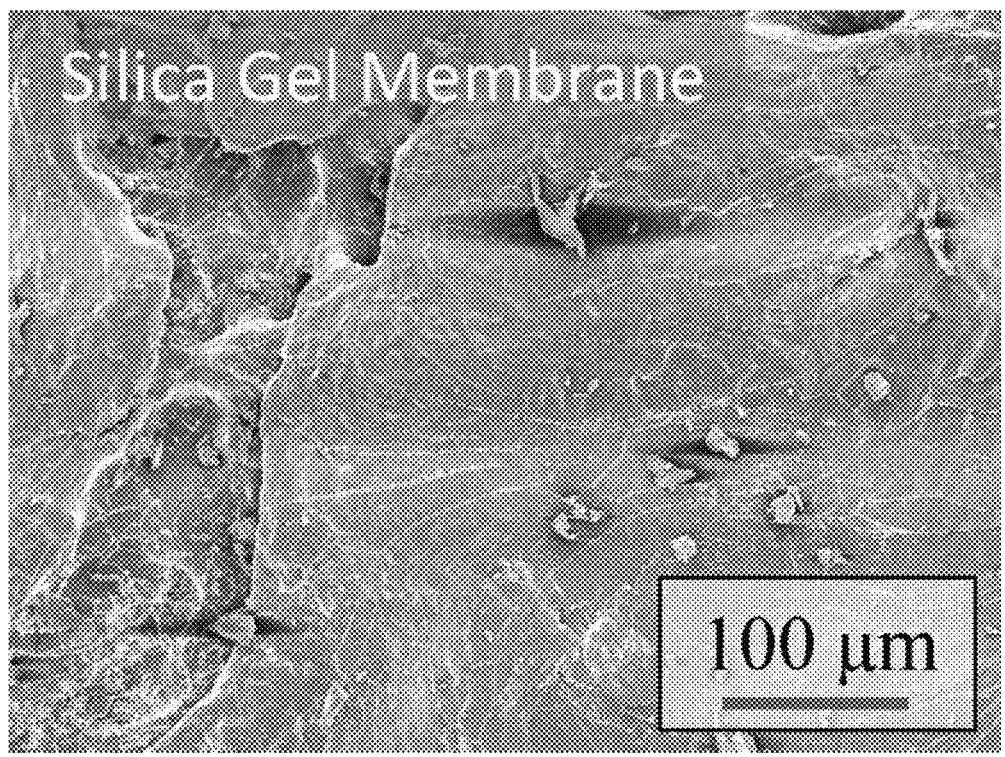
FIG. 2B is a SEM micrograph of a silica selective membrane formed on a silica support in accordance with certain embodiments disclosed herein.

FIG. 2A is a SEM micrograph of a silica support of the type usable as a porous membrane substrate in accordance with certain embodiments disclosed herein (specifically of the type disclosed above with regard to FIG. 1A). FIG. 2B is a SEM micrograph of a silica selective membrane formed on a glass fiber support in accordance with certain embodiments disclosed herein(specifically of the type disclosed above with regard to FIG. 1A). FIGS. 2A and 2B are SEM images of the surface of materials that have been coated with a 10 nm layer of Au/Pd to reduce charging during imaging. The glass fiber support is produced by Pall Corp and is a borosilicate glass fiber support without binder ("Type A/C"). The nominal pore size is 1 micron and the thickness is 254 microns.

Figure 3A:
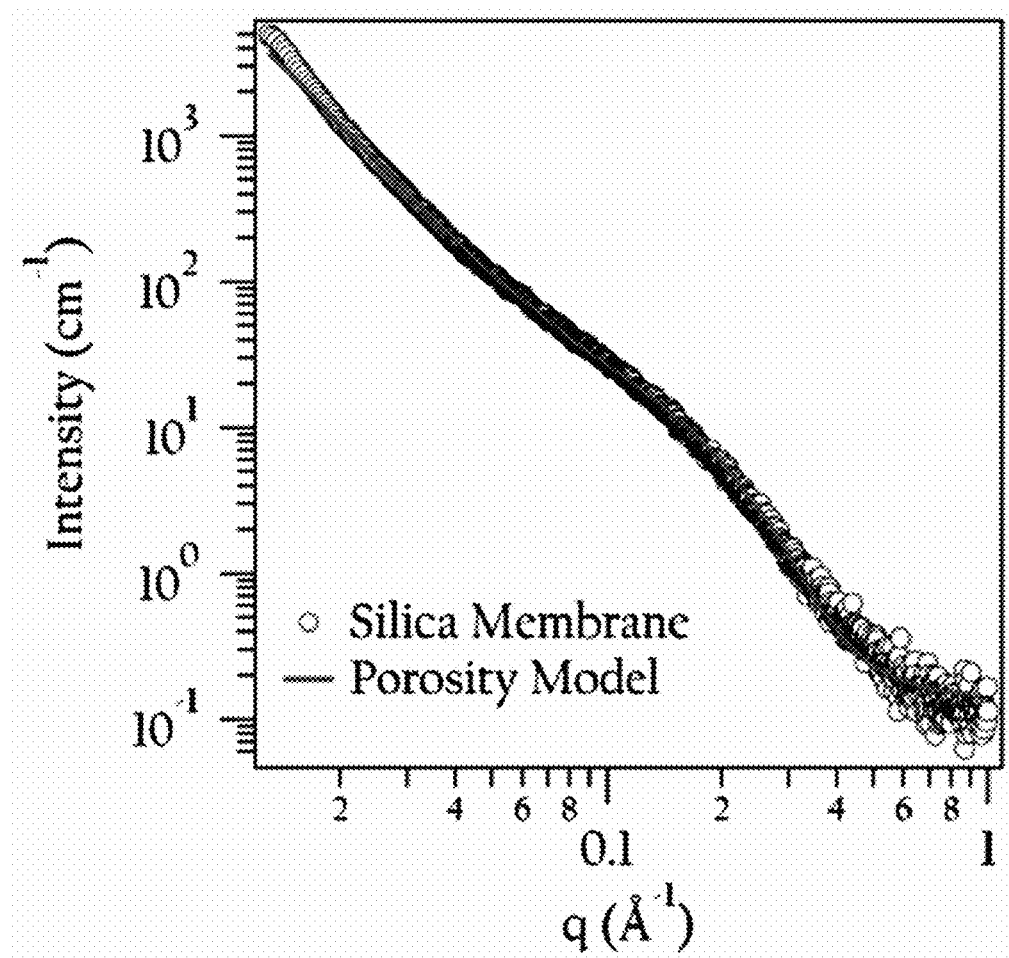
FIG. 3A: Small angle x-ray scattering (SAXS) profile of a membrane fit with a fractal aggregate model.
Figure 3B:
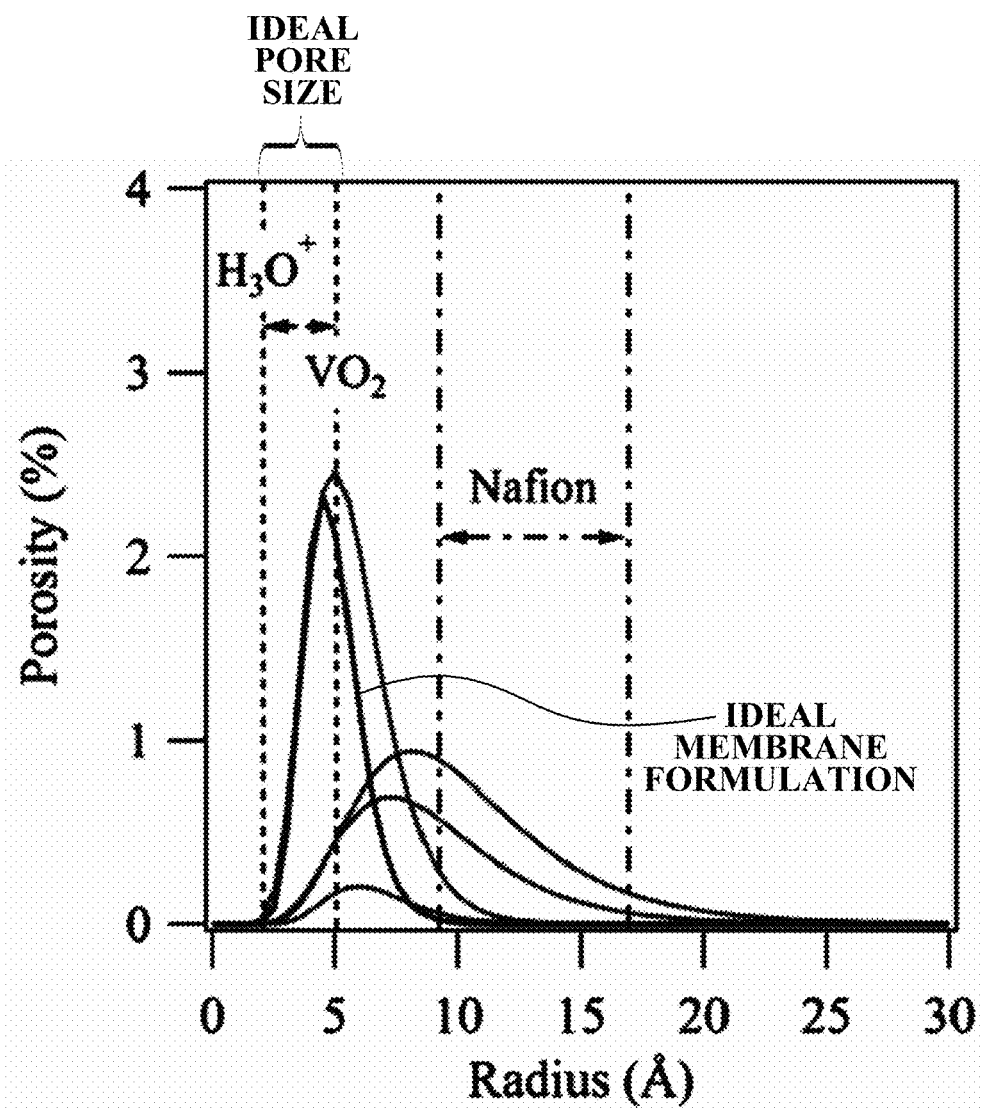
FIG. 3B: Pore size distribution based on SAXS modeling. The ideal pore size based on ionic radii of ions in flow batteries is noted. Ideal pore size distribution is noted between the radius of $H_3O^+$ and $VO_2$. The known pore size range of NAFION is also noted.

FIG. 3A: Small angle x-ray scattering (SAXS) profile of a membrane fit with a fractal aggregate model. FIG. 3B: Pore size distribution based on SAXS modeling. The ideal pore size based on ionic radii of ions in flow batteries is noted. Ideal pore size distribution is noted between the radius of $H_3O^+$ and $VO_2$. The known pore size range of NAFION is also noted. These samples were all processed using the method of FIG. 1 as discussed above. The SAXS profile in FIG. 3A is for a membrane formed using nitric acid. In FIG. 3B the only difference between the curves is acid type. The following mean radius (in Angstroms) was found for the corresponding acids: 4.5=$CH_3COOH$ (Acetic), 5.0=HCl, 6.0=$CH_3SO_4$ (Methane Sulfonic), 7.2=$H_3PO_4$, 8.1=$HNO_3$. These FIGURES demonstrate that we can achieve various pore sizes depending on processing conditions. NAFION is included for reference in FIG. 3B. In view of these data, the ideal pore size (radius) of the ceramic selective membranes is 3 nm and below.

Figure 4:
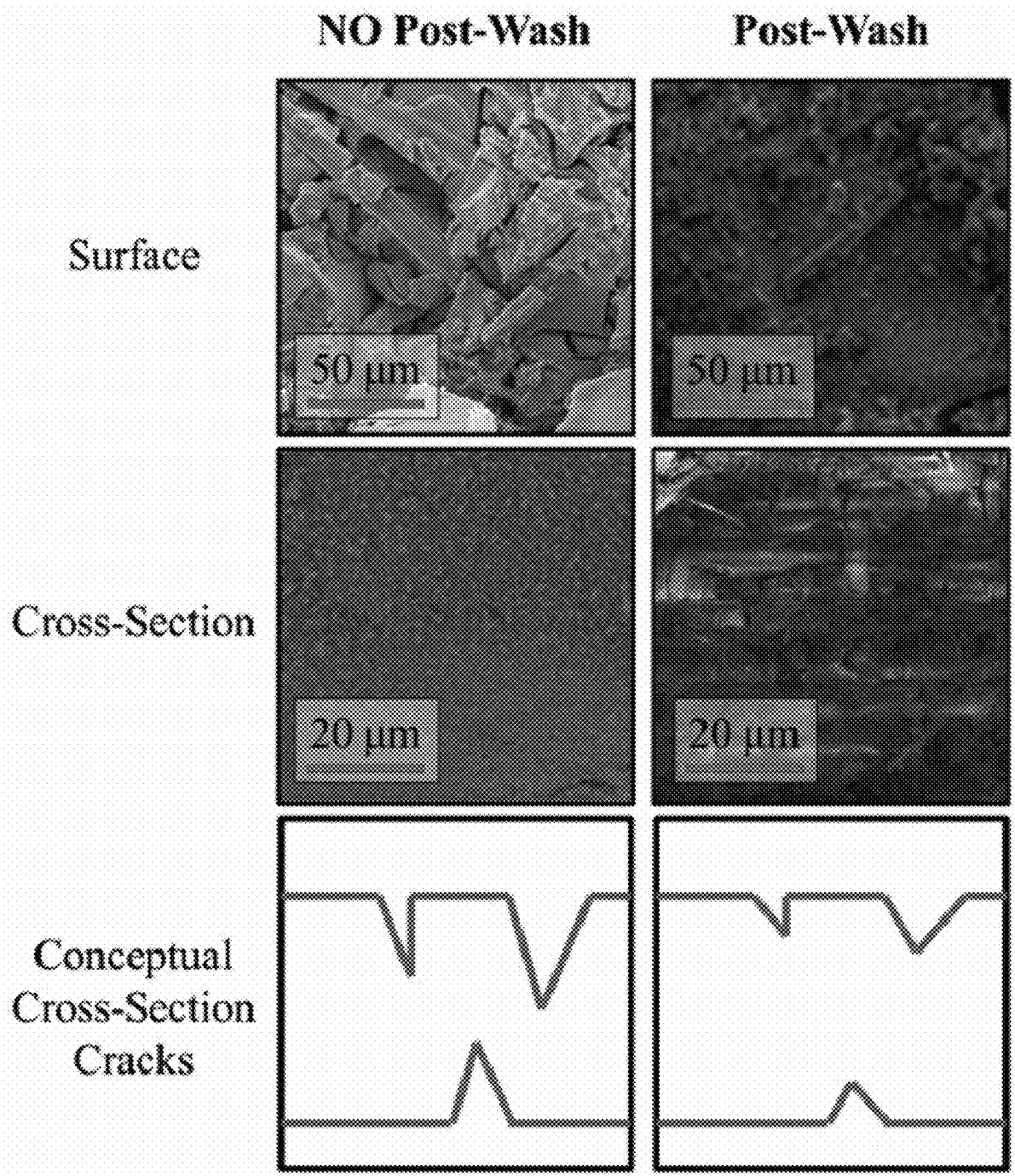
FIG. 4: SEM images of exemplary ceramic selective membrane surfaces and cross-sections. The right membrane was dipped in a methanol/water mixture to reduce capillary stresses prior to drying. Conceptual depictions of the membrane cross-sections are also shown.

FIG. 4: SEM images of exemplary ceramic selective membrane surfaces and cross-sections. The right membrane was dipped in a methanol/water mixture to reduce capillary stresses prior to drying. Conceptual depictions of the membrane cross-sections are also shown. This FIGURE shows that we can generate dense silica structures within the membrane. These may have surface cracks but do not have bridging cracks that ruin membrane performance. Furthermore, the surface cracking can be reduced by dipping the membrane into a water/methanol bath prior to drying. These samples were made using the standard process previously described with regard to FIG. 1A. The acid used in both was 3N $H_3PO_4$ and they were made using 2 dip cycles (also previously described). The No-Post Wash sample was dried as normal at 70° C. The Post-Wash was dipped in a 50/50 v/v water/methanol mixture for 1 hour prior and then dried at 70° C. (this dip was only performed on the last cycle).

Figure 5:
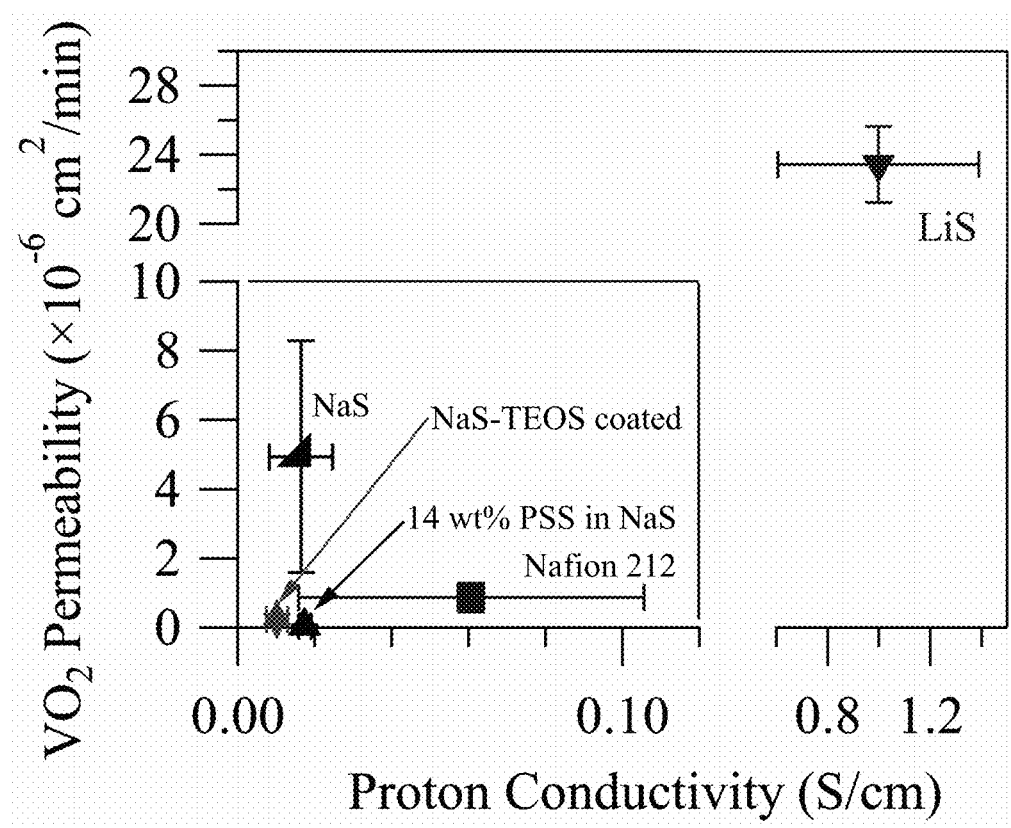
FIG. 5 graphically illustrates proton conductivity versus $VO_2$ permeability for representative ceramic selective membranes ("SS" is a membrane formed from all sodium silicate; "14 wt % PSS in SS" is a membrane formed with 14 wt % of PSS in a sodium silicate sol; "NaS-TEOS" is a membrane formed with a combination of sodium silicate and TEOS to form an aggregate composite membrane; and "LiS" is a membrane formed in a similar manner to the NaS membrane but with lithium silicate instead of sodium silicate) compared to the commercial material NAFION 212.

FIG. 5 graphically illustrates proton conductivity versus $VO_2$ permeability for representative ceramic selective membranes ("NaS" is a membrane formed from all sodium silicate; "14 wt % PSS in NaS" is a membrane formed with 14 wt % of PSS in a sodium silicate sol; "NaS-TEOS" is a membrane formed with a combination of sodium silicate and TEOS to form an aggregate composite membrane; and "LiS" is a membrane formed in a similar manner to the NaS membrane but with lithium silicate instead of sodium silicate) compared to the commercial material NAFION 212.

FIG. 5 illustrates a number of key performance attributes for flow batteries for formulations that have been discussed already.

Proton conductivity is tested in a 4M $H_2SO_4$ solution with a galvanodynamic sweep from 0 to 200 mA. The measurement is performed in an h-cell with luggin capillaries, platinum leads and Ag/AgCl reference electrode.

The vanadium permeability is also performed in an h-cell with 1.5M $VOSO_4$ and 2M $H_2SO_4$ on one side and 1.5M $MgSO_4$ and 2M $H_2SO_4$ on the other side. Aliquots of liquid are taken as a function of time to track vanadium diffusion across the membrane. Vanadium is blue and the concentration can be determined using UV-vis.

While the ideal is low permeability and high conductivity, high conductivity and modest permeability is also valuable because it enables batteries to charge faster. NaS-membranes are good candidates because they are similar to NAFION but dramatically less expensive to produce.

NAFION 212 is defined as 2 mil thick NAFION (tetrafluoroethylene-perfluoro-3,6-dioxa-4-methyl-7-octenesulfonic acid copolymer). The pure NaS is a sodium silicate sample processed in the same was as described previously with regard to FIG. 1A (i.e., with 2 coats and a 70° C. drying step).

The 14 wt % PSS in NaS is polystyrene sulfonate and sodium silicate. In this case, the PSS is mixed with the sodium silicate prior to wicking into the substrate. The PSS acts as an acid and so the acid dip step is not used in this method. Roughly 1 minute after mixing PSS and NaS, the substrate is dipped and the composite solution wicks into the macroporous substrate. The membrane is then removed and gelled/dried at room temperature for 1 week.

The lithium silicate (LiS) sample is processed the same way as sodium silicate in FIG. 1A. It is Lithisil™ 25 (23% lithium silicate and 77% water). The acid used was 3N $H_3PO_4$ for 24 hours. It was not dried, but instead is immediately removed and tested.

The NaS-TEOS is processed differently. In this case, the macroporous substrate is dipped in sodium silicate (which is slightly basic) for 30 seconds (for wicking) and then placed on a sheet. The TEOS is then added as a top layer and it reacts with the water (hydrolysis) and the base acts as a catalyst. The TEOS and sodium silicate aggregate to form a dense structure within the support. Some of the TEOS evaporates during gelation/drying. The gelation/drying process is left for 1 week at room temperature.

All of these samples tested in FIG. 5 have a ~1 cm$^2$ active area and 5 cm$^2$ total area, including edging.

Figure 6A:
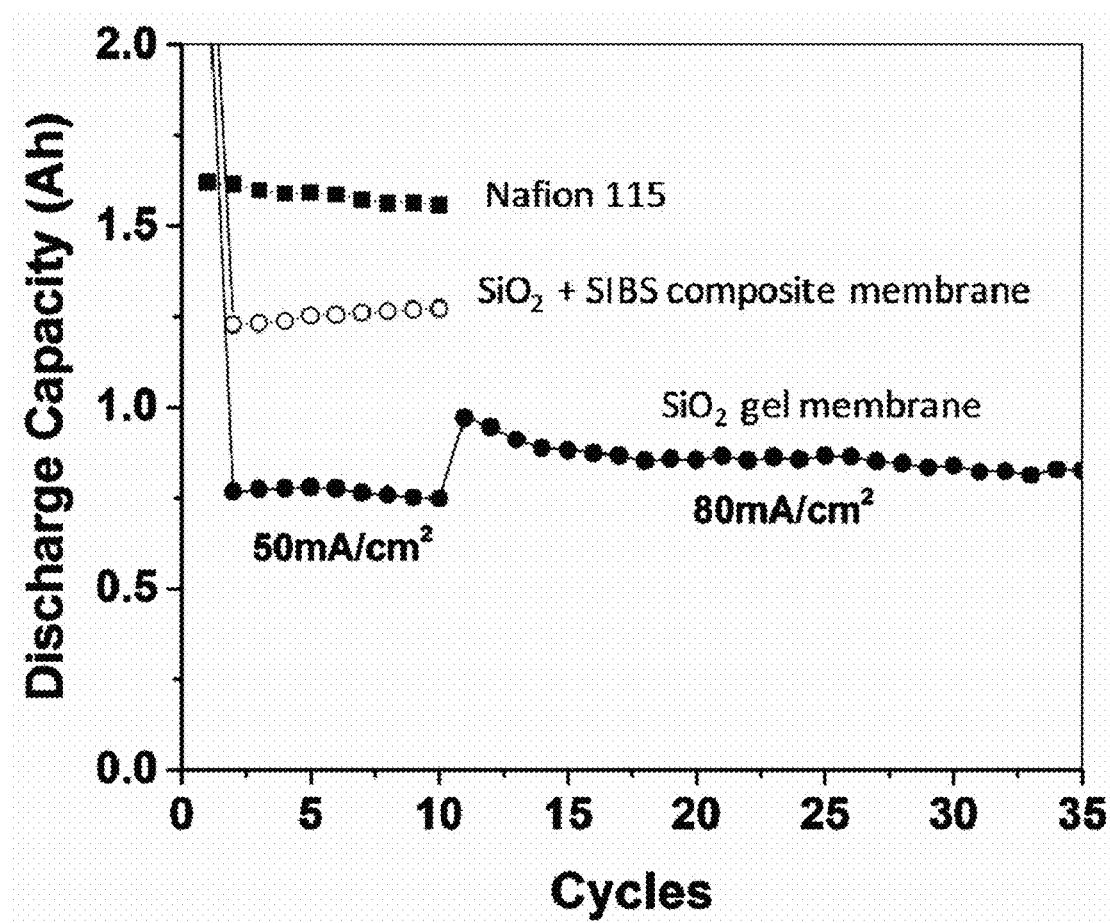
FIG. 6A graphically illustrates cycling capacity of an exemplary all-vanadium RFB using exemplary sol-gel $SiO_2$; exemplary sol-gel $SiO_2$+SIBS composite; and comparative NAFION 115.
Figure 6B:
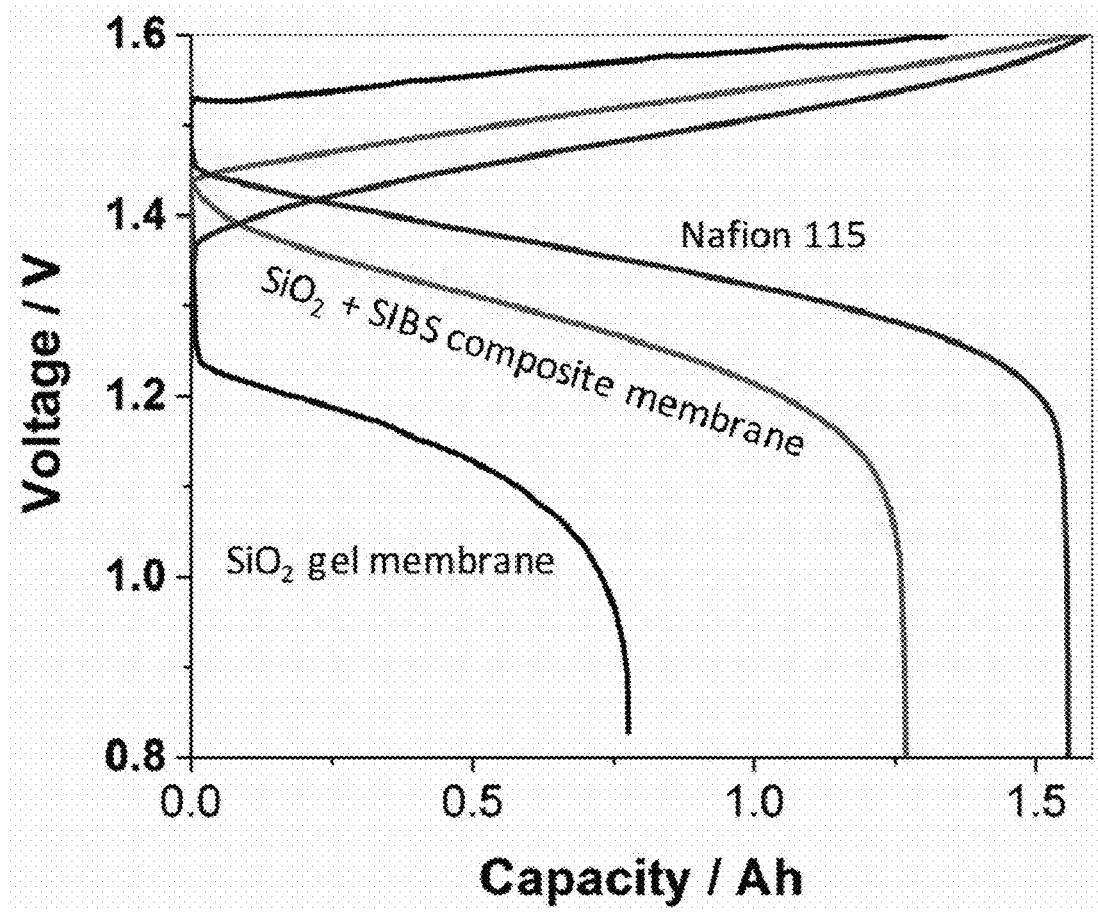
FIG. 6B illustrates voltage profiles for RFBs including the membranes of FIG. 6A.

FIG. 6A graphically illustrates cycling capacity of an exemplary all-vanadium RFB using exemplary sol-gel SiO$_2$; exemplary sol-gel SiO$_2$+SIBS composite; and comparative NAFION 115. FIG. 6B illustrates voltage profiles for RFBs including the membranes of FIG. 6A.

Figure 7A:
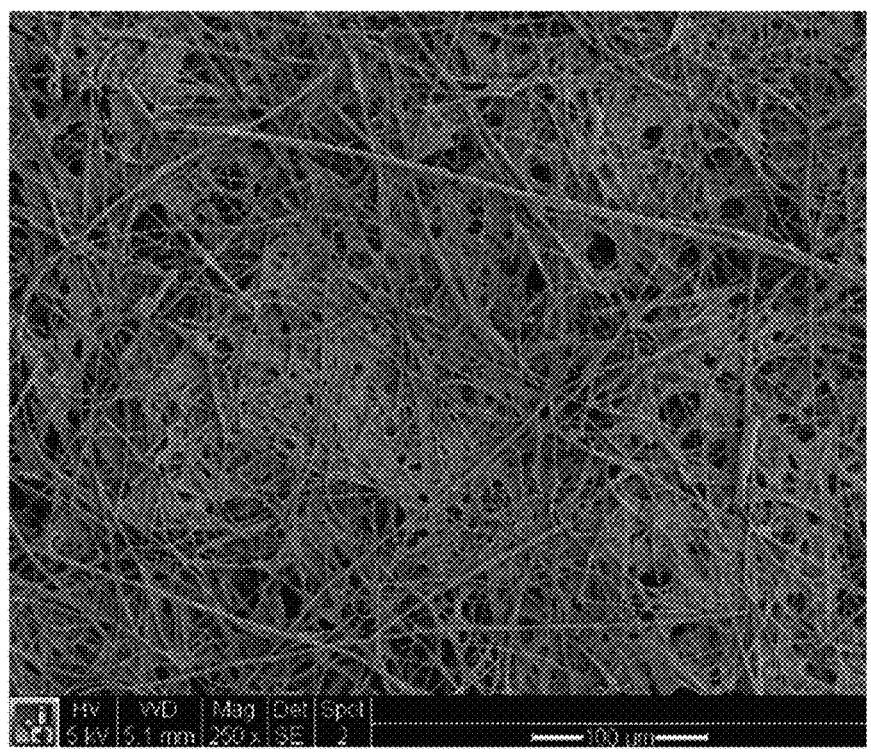
FIGS. 7A and 7B are SEM images of a TEOS-sodium silicate membrane in accordance with embodiments disclosed herein.
Figure 7B:
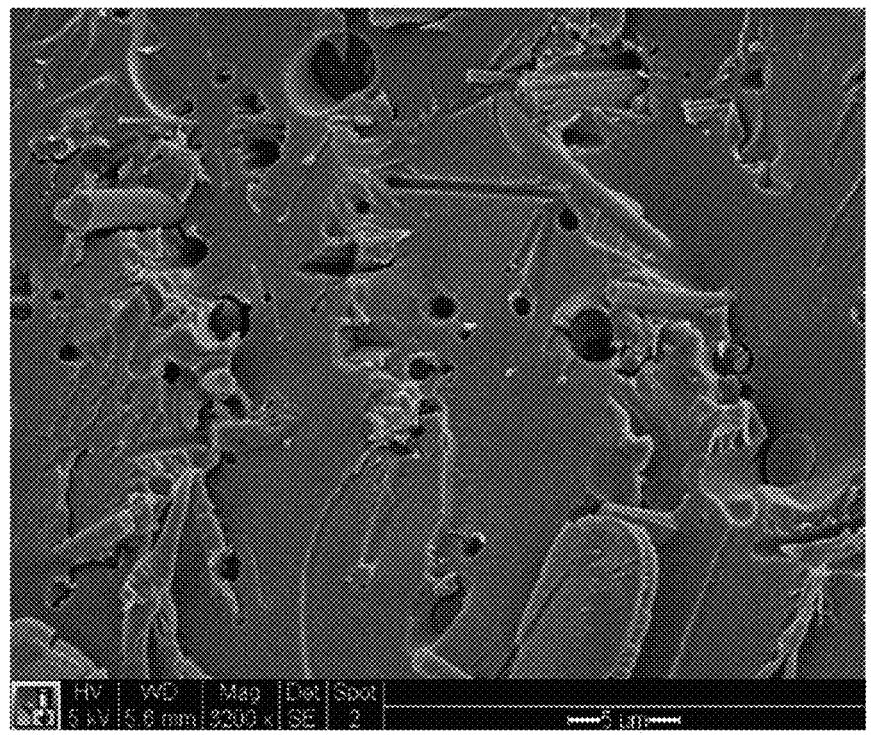

FIGS. 7A and 7B are SEM images of a TEOS-sodium silicate membrane in accordance with embodiments disclosed herein. FIG. 7A is a top view and FIG. 7B is a dense cross-sectional view.

FIG. 8 graphically illustrates the fractal dimension extracted from SAXS fitting of representative membranes using the fractal model (shown in FIG. 3A). The selectivity (proton conductivity/vanadium ion permeability) is plotted as a function of the fractal dimension showing higher selectivity for lower fractal dimensions. NAFION is plotted for reference. The method used here is the same as the one described in FIG. 3A and the fractal dimensions correspond to the following acids: 2.97=CH$_3$SO$_4$, 1.6=H$_3$PO$_4$, 2.88=CH$_3$COOH, 2.49=H$_2$SO$_4$, 2.67=HNO$_3$, 2.4=HCl.

Any approximate terms, such as "about," "approximately," and "substantially," indicate that the subject can be modified by plus or minus 5% and fall within the described embodiment.

While illustrative embodiments have been illustrated and described, it will be appreciated that various changes can be made therein without departing from the spirit and scope of the invention.

The invention claimed is:

1. A method of forming a ceramic selective membrane, the method comprising:
   applying a ceramic precursor sol to a porous membrane substrate; and
   gelling the ceramic precursor sol, using a sol-gel process, to form a selective silica ceramic from the ceramic precursor sol, thereby providing a ceramic selective membrane comprising the selective silica ceramic supported by the porous membrane substrate;
   wherein the ceramic precursor sol comprises an alkaline silicate solution;
   wherein the porous membrane substrate has a plurality of pores 10 nm or greater in diameter;
   further comprising a step of impregnating an edge portion of the porous membrane substrate with a compressible polymer prior to the step of applying the ceramic precursor sol to the porous membrane substrate;
   wherein gelling the ceramic precursor sol comprises chemical gelation
   wherein gelling the ceramic precursor sol comprises exposing to a temperature in the range of 20° C. to 100° C.;
   wherein the ceramic selective membrane comprises pores in the size range of 0.1 nm to 10 nm in diameter;
   wherein the ceramic selective membrane has a thickness in the range of 0.1 mm to 1 mm; and
   wherein the ceramic precursor sol further comprises an additive selected from the group consisting of a selectivity additive configured to increase ion transport properties of the ceramic selective membrane, a durability additive configured to improve durability of the ceramic selective membrane, and a catalyst additive configured to add catalytic properties to the ceramic selective membrane.

2. The method of claim 1, wherein the alkaline silicate solution is formed from a silicate selected from the group consisting of sodium silicate, lithium silicate, and potassium silicate.

3. The method of claim 1, wherein the alkaline silicate solution has a concentration in the range of 5 wt % to 50 wt %.

4. The method of claim 1, wherein the porous membrane substrate is selected from the group consisting of silica filter paper, polyvinylidene fluoride (PVDF), polyether ether ketone (PEEK), polytetrafluoroethylene (PTFE).

5. The method of claim 1, wherein the step of impregnating the edge portion of the porous membrane substrate with the compressible polymer comprises impregnating all edges of the porous membrane substrate with the compressible polymer, sufficient to form a gasket bordering the porous membrane substrate.

6. The method of claim 1, wherein the edge portion is 1 mm or greater in width.

7. The method of claim 1, wherein the compressible polymer comprises a thermoplastic elastomeric polymer.

8. The method of claim 1, wherein impregnating the edge portion of the porous membrane substrate with the compressible polymer comprises a method selected from the group consisting of melting, solution deposition, and in situ reaction.

9. The method of claim 1, wherein chemical gelation comprises exposing the ceramic precursor sol to an acid solution.

10. The method of claim 1, wherein gelling the ceramic precursor sol further comprises exposing to a temperature in the range of 20° C. to 100° C.

11. The method of claim 1, further comprising depositing at least one additional layer of ceramic by:
   applying the ceramic precursor sol to the selective silica ceramic supported by the porous membrane substrate; and
   gelling the ceramic precursor sol to provide a double-coated selective silica ceramic supported by the porous membrane substrate.

12. The method of claim 11, further comprising repeating for a second time the step of depositing at least one additional layer of ceramic, to provide a triple-coated selective silica ceramic supported by the porous membrane substrate.

13. The method of claim 1, further comprising depositing a finishing layer on the selective silica ceramic supported by the porous membrane substrate to provide a finished-coated selective silica ceramic supported by the porous membrane substrate.

14. The method of claim 13, wherein the step of depositing a finishing layer comprises treating the selective silica ceramic supported by the porous membrane substrate with a silica-based compound with a hydrolyzable group.

15. The method of claim 14, wherein the step of treating the selective silica ceramic supported by the porous membrane substrate by applying a silica-based compound with a hydrolyzable group further comprises a step of exposing the silica-based compound with a hydrolyzable group to water after applying the silica-based compound with a hydrolyzable group to the selective silica ceramic supported by the porous membrane substrate.

16. The method of claim 1, wherein the additive is a selectivity additive selected from the group consisting of an ionic-conducting polymer and a gas conducting polymer.

17. The method of claim 1, wherein the additive is a durability additive selected from the group consisting of a low Young's modulus polymer configured to provide increased flexibility to the ceramic selective membrane and a high Young's modulus polymer configured to provide increased durability to the ceramic selective membrane.

18. The method of claim 1, further comprising a step of exposing the ceramic selective membrane to a lower-surface-tension liquid, after gelling the ceramic precursor sol.

19. A ceramic selective membrane formed by a method according to claim 1.

20. A selective membrane comprising a ceramic selective membrane according to claim 19.

* * * * *